United States Patent
Tsai et al.

(10) Patent No.: US 11,405,929 B2
(45) Date of Patent: Aug. 2, 2022

(54) ELECTRONIC DEVICE AND METHOD FOR BEAM FAILURE RECOVERY

(71) Applicant: MEDIATEK INC., Hsinchu (TW)

(72) Inventors: Cheng-Rung Tsai, Hsinchu (TW); Guan-Yu Lin, Hsinchu (TW); Chia-Hao Yu, Hsinchu (TW); Weidong Yang, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/585,413

(22) Filed: Sep. 27, 2019

(65) Prior Publication Data

US 2020/0107331 A1 Apr. 2, 2020

Related U.S. Application Data (60) Provisional application No. 62/737,983, filed on Sep. 28, 2018.

(51) Int. Cl.
| | | |
|---|---|---|
| *H04L 5/00* | (2006.01) | |
| *H04B 7/06* | (2006.01) | |
| *H04B 7/08* | (2006.01) | |
| *H04W 72/08* | (2009.01) | |

(Continued)

(52) U.S. Cl.
CPC ......... *H04W 72/085* (2013.01); *H04L 5/0032* (2013.01); *H04W 72/046* (2013.01); *H04W 72/0413* (2013.01); *H04W 72/0446* (2013.01); *H04W 76/19* (2018.02)

(58) Field of Classification Search
None
See application file for complete search history.

(56) References Cited

U.S. PATENT DOCUMENTS

| | | | | |
|---|---|---|---|---|
| 2018/0220448 | A1* | 8/2018 | Akkarakaran | ...... H04W 72/044 |
| 2018/0279284 | A1 | 9/2018 | Wang et al. | |
| 2019/0089447 | A1* | 3/2019 | Sang | ............... H04W 36/00837 |

(Continued)

FOREIGN PATENT DOCUMENTS

| | | |
|---|---|---|
| CN | 107612602 A | 1/2018 |
| WO | WO 2017/221202 A1 | 12/2017 |
| WO | WO 2018/027904 A1 | 2/2018 |

OTHER PUBLICATIONS

Combined Taiwanese Office Action and Search Report dated Sep. 30, 2020 in Taiwanese Patent Application No. 108135288 (with English translation of categories of cited documents), 8 pages.

(Continued)

*Primary Examiner* — Ajit Patel
(74) *Attorney, Agent, or Firm* — Oblon, McClelland, Maier & Neustadt, L.L.P.

(57) ABSTRACT

Aspects of the disclosure provide an electronic device including a transceiver and processing circuitry. The transceiver can be configured to wirelessly receive at least one signal from a network including a first cell. The at least one signal can indicate a link quality of a wireless link formed between the electronic device and the base station in a first cell. The processing circuitry can be configured to determine whether beam failure occurs on the first cell based on at least one signal quality of the at least one signal. When the beam failure is determined to occur on the first cell, the processing circuitry can be configured to report information of the first cell to the network indicating the beam failure on the first cell.

18 Claims, 7 Drawing Sheets

(51) Int. Cl.
    *H04W 72/04*     (2009.01)
    *H04W 76/19*     (2018.01)

(56) References Cited

U.S. PATENT DOCUMENTS

2019/0253986 A1*   8/2019   Jeon .................... H04W 72/042
2019/0335522 A1   10/2019   Zhang et al.
2020/0274606 A1*   8/2020   Kang ................... H04B 7/0695
2020/0374960 A1*  11/2020   Deenoo ................ H04W 72/14

OTHER PUBLICATIONS

"MAC Impacts: Beam Failure Recovery for SCell" Samsung, 3GPP TSG-RAN2 102, R2-1806819, May 21-25, 2018, 3 pages.
International Search Report and Written Opinion dated Jan. 6, 2020 in PCT/CN2019/108570, 9 pages.
MediaTek Inc., "Beam Management and Beam Recovery in MAC", 3GPP TSG-RAN WG2 #100, R2-1712871, Dec. 1, 2017, 4 pages.

* cited by examiner

| NR Format | Format 0 |
|---|---|
| Symbol No. | 1~2 (short) |
| PRB No. | 1 |
| UCI bits | 1 or 2 |
| UE mux | Up to 12 |

$$\bar{r}_{u,v}(n) = e^{j\varphi(n)\pi/4}, \quad 0 \leq n \leq M_{ZC}-1$$

| u | $\varphi(0),\ldots,\varphi(11)$ | | | | | | | | | | | |
|---|---|---|---|---|---|---|---|---|---|---|---|---|
| 0 | 1 | -1 | 3 | 1 | 1 | -1 | -1 | -1 | 1 | 3 | -3 | 1 |
| 1 | -1 | -1 | -1 | -1 | 1 | -3 | -1 | 3 | 3 | -1 | -3 | 1 |
| 2 | -3 | 1 | -3 | -3 | -3 | 3 | -3 | -1 | 1 | 1 | 1 | -3 |
| 3 | -3 | 3 | 1 | 3 | -3 | 1 | 1 | 1 | 1 | 3 | -3 | 3 |
| 4 | -3 | 1 | 3 | -1 | -1 | -3 | -3 | -1 | -1 | 3 | 1 | -3 |
| 5 | -1 | 1 | 1 | -1 | 1 | 3 | 3 | -1 | -1 | -3 | 1 | -3 |
| 6 | -3 | -3 | -1 | 3 | 3 | 3 | -3 | 3 | -3 | 1 | -1 | -3 |
| 7 | -3 | 3 | -3 | 3 | 3 | -3 | -1 | -1 | 3 | 3 | 1 | -3 |
| 8 | -3 | -1 | -3 | -1 | -1 | -3 | 3 | 3 | -1 | -1 | 1 | -3 |
| 9 | -3 | 3 | 3 | 3 | -1 | -3 | -3 | -1 | -3 | 1 | 3 | -3 |
| 10 | 1 | 3 | -3 | 1 | 3 | 3 | 1 | -1 | 1 | -1 | 3 |
| 11 | -1 | -3 | 3 | -1 | -3 | -3 | -3 | 1 | -1 | 1 | -3 |
| 12 | 3 | 1 | 3 | 1 | 3 | -3 | -1 | 1 | 3 | 1 | -1 | -3 |
| 13 | -3 | -3 | 3 | 3 | 3 | -3 | -1 | 1 | -3 | 3 | 1 | -3 |
| 14 | -3 | -1 | 1 | -3 | 1 | 3 | 3 | -1 | -3 | 3 | 3 |
| 15 | -3 | -3 | 3 | 1 | -3 | -3 | -3 | -1 | 3 | -1 | 1 | 3 |
| 16 | -1 | 1 | 3 | -3 | 1 | -1 | 1 | -1 | -1 | -3 | 1 | -1 |
| 17 | -3 | -1 | -1 | 1 | 3 | 1 | 1 | -1 | 1 | -1 | -3 | 1 |
| 18 | -3 | -1 | 3 | -3 | -3 | -1 | -3 | 1 | -1 | -3 | 3 | 3 |
| 19 | -3 | -3 | 3 | -3 | -1 | 3 | 3 | 3 | -1 | -3 | 1 | -3 |
| 20 | -3 | 1 | -1 | -1 | 3 | 3 | -3 | -1 | -3 | -1 | -3 |
| 21 | -3 | 1 | 3 | 3 | -1 | -1 | -3 | 3 | 3 | -3 | 3 | -3 |
| 22 | -3 | -1 | -1 | -3 | -3 | -1 | -3 | 3 | 1 | 3 | -1 | -3 |
| 23 | -3 | -1 | 3 | 1 | -3 | -1 | -3 | 3 | 1 | 3 | 3 | 1 |
| 24 | -3 | 3 | 3 | 1 | -3 | 3 | -1 | 1 | 3 | -3 | 3 | -3 |
| 25 | 3 | -1 | -3 | 3 | -3 | -1 | 3 | 3 | 3 | -3 | -1 | 3 |
| 26 | 1 | -1 | 3 | -1 | -1 | -1 | -3 | -1 | 1 | 1 | 1 | -3 |
| 27 | -3 | 3 | 1 | -3 | 1 | 3 | -1 | -1 | 1 | 3 | 3 | 3 |
| 28 | -3 | 3 | -3 | 3 | -3 | -3 | 3 | -1 | -1 | 1 | 3 | -3 |
| 29 | -3 | 3 | 1 | -1 | 3 | 3 | -3 | 1 | -1 | 1 | -1 | 1 |

| NR Format | Format 1 |
|---|---|
| Symbol No. | 4~14 (long) |
| PRB No. | 1 |
| UCI bits | 1 or 2 |
| UE mux | Up to 84 (no hop) |

▒ RS (length 12 seq)

☐ UCI (length 12 seq)

FIG. 7C

ELECTRONIC DEVICE AND METHOD FOR BEAM FAILURE RECOVERY

INCORPORATION BY REFERENCE

This present application claims the benefit of priority to U.S. Provisional Application No. 62/737,983 filed on Sep. 28, 2018, which is incorporated by reference herein in its entirety.

TECHNICAL FIELD

The present application relates generally to wireless communication technology including beam-formed transmission and reception.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

High frequency bands (e.g., above 6 GHz) is used in 5th Generation (5G) wireless communication systems to increase system capacity. Beamforming schemes can be employed to focus transmitted and/or received signal in a desired direction to compensate for path loss of high frequency signals. For example, a base station may employ multiple beams to cover a serving area in a 5G system.

SUMMARY

Aspects of the disclosure provide an electronic device that includes a transceiver and processing circuitry. The transceiver can be configured to wirelessly receive at least one signal from a network including a first cell. The at least one signal can indicate a link quality of a wireless link formed between the electronic device and the base station in a first cell. The processing circuitry can be configured to determine whether beam failure occurs on the first cell based on at least one signal quality of the at least one signal. When the beam failure is determined to occur on the first cell, the processing circuitry can be configured to report information of the first cell to the network indicating the beam failure on the first cell.

In an embodiment, the transceiver is configured to receive at least one second signal from the network. The processing circuitry is further configured to identify a new beam for the first cell when at least one signal quality of the at least one second signal is equal to or larger than a threshold where the new beam corresponds to one of the at least one second signal. The processing circuitry can report information of the new beam to the network. In an example, the processing circuitry is further configured to report the information of the first cell and the information of the new beam to the network using a MAC CE transmitted on a PUSCH.

In an embodiment, the processing circuitry can be further configured to transmit a beam failure recovery request (BFRQ) to the network prior to reporting the information of the first cell and the information of the new beam to the network when the beam failure is determined to occur on the first cell. The processing circuitry can transmit the BFRQ using a PUCCH. Further, the processing circuitry can transmit the BFRQ using the PUCCH resource that is sequence-based in a scheduling request (SR)-like configuration that includes a resource identifier (ID), a period and an offset of a PUCCH transmission occasion using the PUCCH resource.

In an example, the electronic device is served by a second cell configured with the PUCCH. The processing circuitry can transmit the BFRQ using the PUCCH configured for the second cell.

In an example, the transceiver is configured to receive configuration information for the PUCCH and receive an uplink (UL) grant signal from the network after transmitting the BFRQ using the PUCCH where the UL grant signal grants a PUSCH to the electronic device. The processing circuitry can report the information of the first cell and the information of the new beam using a MAC CE transmitted on the PUSCH granted by the UL grant signal.

Aspects of the disclosure provide a non-transitory computer readable medium having computer readable instructions stored thereon which, when executed by a processing circuit, cause the processing circuit to perform a method. The method includes wirelessly receiving at least one signal from a network including a first cell and determining whether beam failure occurs on the first cell based on at least one signal quality of the at least one signal. When the beam failure is determined to occur on the first cell, the method includes reporting information of the first cell to the network indicating the beam failure on the first cell.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
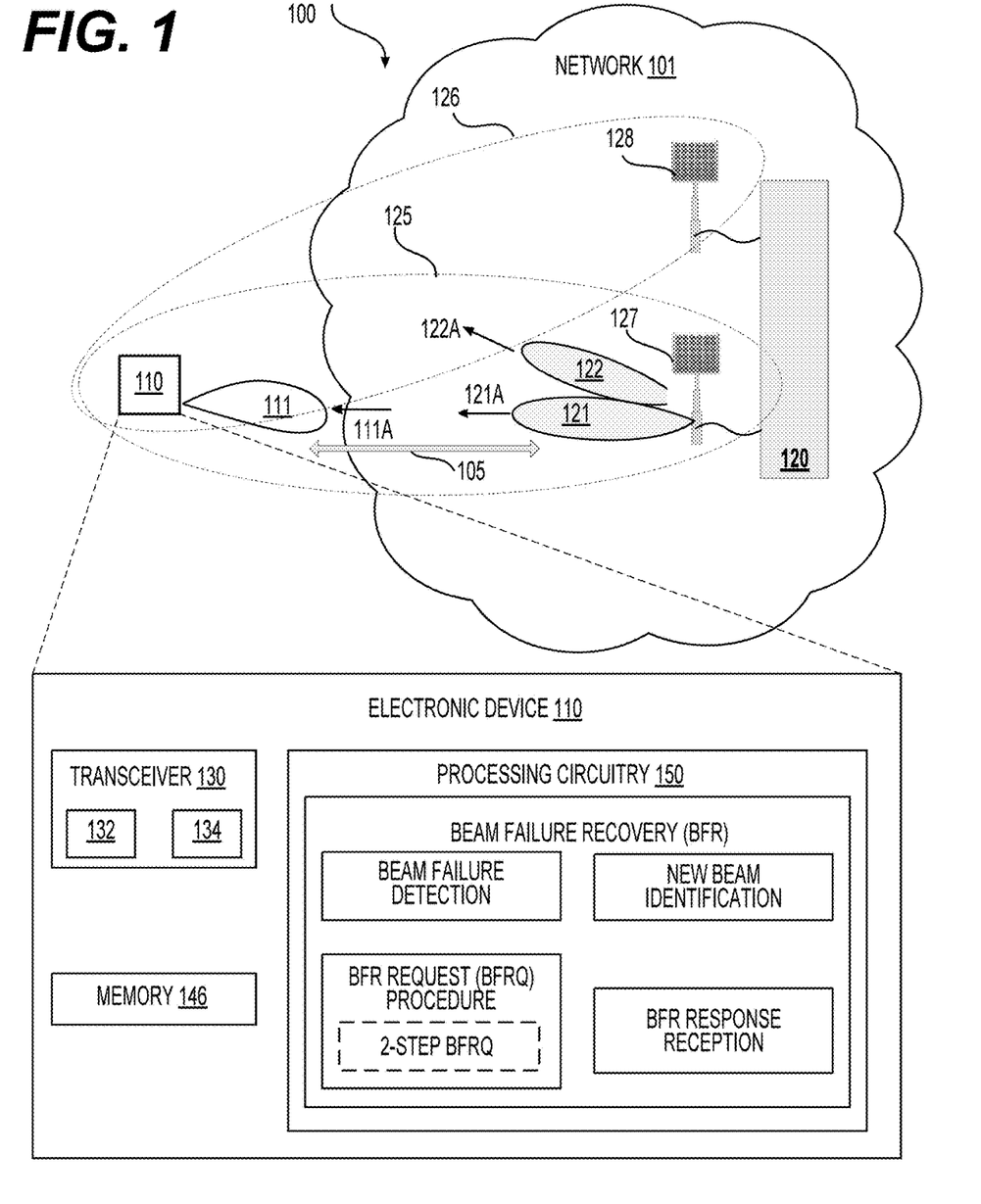
FIG. 1 shows a block diagram of an exemplary communication system 100 according to an embodiment of the disclosure.

FIG. 1 shows a block diagram of an exemplary communication system 100 according to an embodiment of the disclosure. The communication system 100 includes a network 101 and an electronic device 110 that receives wireless communication service from the network 101. A base station 120 in the network 101 can be configured to form one or more cells that serve the electronic device 110. In an embodiment, the base station 120 controls a first transmission reception point (TRP) 127 to cover a first cell 125 and a second TRP 128 to cover a second cell 126, and thus the one or more cells include the first cell 125 having a first carrier and the second cell 126 having a second carrier. The first carrier and the second carrier can be aggregated and transmitted in parallel to/from the electronic device 110 in carrier aggregation (CA), and thus increasing a bandwidth and a date rate. In an example, the network 101 includes a fifth generation (5G) radio access network (RAN) (or Next Generation (NG) RAN) and a 5G core network (5GC) that uses 5G mobile network technology. The base station 120 is a next generation Node B (gNB) specified in 5G new radio (NR) air interface standards developed by 3rd Generation Partnership Project (3GPP). The second cell 126 is a primary cell (PCell) or a primary secondary cell (PSCell), and the first cell 125 is a secondary cell (SCell).

In an embodiment, in the first cell 125, the electronic device 110 communicates wirelessly with the base station 120 (e.g., via the first TRP 127) via a wireless link 105 (also referred to as a link 105) associated with a beam 121 transmitted from the base station 120. In general, a beam is allocated with radio resources including a set of time and/or frequency resources. In some embodiments, a beam is further associated with a direction indicating a dominant propagation direction of signal energy of the beam. For example, in the first cell 125, beams 121-122 transmitted from the first TRP 127 of the base station 120 mainly propagate along directions 121A-122A, respectively, thus, are referred to as transmission beams (Tx beams) 121-122 of the base station 120. In some embodiments, a beam can refer to a signal or a channel transmitted from or received by the electronic device 110 or the base station 120.

In general, beam management, i.e., a set of procedures to acquire and maintain a set of Tx and Rx beams, is implemented to form and maintain a suitable link between the base station 120 and the electronic device 110 for uplink and downlink transmission/reception. In some embodiments, beam management can include initial beam establishment, beam adjustment or beam tracking, and beam failure recovery. The initial establishment can initially establish the link (or a beam pair such as the beam 121 and a reception beam (Rx beam) 111 of the electronic device 110) between the base station 120 and the electronic device 110. After the link is established, beam adjustment (also referred to as beam tracking) including a regular reevaluation and potential adjustment of the beam pair can be used to compensate for movements and rotations of the electronic device 110, gradual changes in an environment, and the like. A feedback rate for a beamformed channel state can refer to a frequency of the regular reevaluation of the beam pair. While a higher feedback rate can provide more up-to-date information of the beam pair, the higher feedback rate can also result in a larger signaling overhead. In some cases, movements in the environment or other events may result in sudden blockage of the beam pair, and thus a sudden connection loss that occurs faster than the feedback rate and without sufficient time for the beam adjustment to adapt, resulting in a beam failure on the first cell 125. The beam failure (also referred to as a beam failure event) on the first cell 125 can occur, for example, when the link is broken and there is no sufficient time for the regular beam adjustment to adapt the broken link. Accordingly, a set of procedures (also referred to beam failure recovery or BFR, beam recovery) can be implemented to handle the beam failure. In general, BFR can include four steps: beam failure detection, new beam identification, a BFR request (BFRQ) procedure, and BFR response (BFRR) reception.

According to aspects of the disclosure, when beam failure is detected on the first cell 125, the electronic device 110 can transmit a BFRQ to the network 101, for example, by using a Physical Uplink Control Channel (PUCCH) where the BFRQ indicates the beam failure on the first cell 125. Further, the electronic device 110 can report to the network 101 information, such as an index or identifier (ID), of the first cell 125 (i.e., the failed cell) and/or corresponding new beam information used to form the new link. When no new beam is identified, the electronic device 110 can report a state that no new beam is identified in the first cell 125. In an embodiment, the electronic device 110 can implement a 2-step BFRQ procedure including a 1st step (also referred to as a 1st step BFRQ) and a 2nd step (also referred to as a 2nd step BFRQ) when beam failure is detected on the first cell 125. The 1st step includes transmitting the BFRQ indicating the beam failure on the first cell 125 to the network 101. The 1st step can be implemented using a dedicated PUCCH or PRACH resource, such as a sequence-based PUCCH resource in a scheduling request (SR)-like configuration. The 2nd step includes reporting the information of the first cell 125 and/or the corresponding new beam information. The 2nd step can be implemented by a payload transmitted on an uplink channel, such as Medium Access Control (MAC) control element (CE) on a Physical Uplink Shared Channel (PUSCH) or Uplink Control Information (UCI) on a PUCCH.

The network 101 includes various base stations, such as the base station 120, and core nodes that are interconnected using any suitable network technology, such as wired, wireless, a cellular communication technology, a local area network (LAN), a wireless LAN (WLAN), a fiber optical network, a wide area network (WAN), a peer-to-peer network, the Internet, and the like. In some embodiments, the network 101 provides wireless communication service to electronic devices, such as the electronic device 110, using any suitable wireless communication technology, such as second generation (2G), third generation (3G), and fourth generation (4G) mobile network technologies, 5G mobile network technology, global system for mobile communication (GSM), long-term evolution (LTE), NR technology, and the like. In some examples, the network 101 employs wireless communication technologies developed by 3GPP. In an example, the base stations in the network 101 form one or more access networks and the core nodes form one or more core networks. An access network can be a RAN, such as a 5G RAN or NG RAN. A core network can be an evolved packet core (EPC), a 5GC, and the like. In an example, the network 101 includes a 5G RAN having the base station 120 and a 5GC.

In various examples, the base station 120 can be referred to as a Node B, an evolved Node B, a gNB, and the like. In an example, the base station 120 is a gNB specified in 5G NR air interface standards developed by 3GPP. The base station 120 includes hardware components and software components configured to enable wireless communications between the base station 120 and the electronic device 110. Further, the core nodes include hardware components and software components to form a backbone to manage and control the services provided by the network 101.

In some embodiments, high frequencies, also referred to as millimeter Wave (mmWave) frequencies are used as carrier frequencies in the communication system 100 to increase a network capacity. In an example, the high frequencies are higher than 6 giga-Hertz (GHz), such as between 24-84 GHz. In an example, carrier frequencies less than 6 GHz are referred to as low frequencies, such as between 600 MHz to less than 6 GHz. For example, a frequency range 1 (FR1) includes frequencies below 6 GHz and a frequency range 2 (FR2) includes frequencies in the range 24.25-52.6 GHz. Signals (or beams) having mmWave frequencies as carrier frequencies, referred to as high frequency (HF) signals, can experience large propagation loss and can be sensitive to blockage. Accordingly, for the HF signals, the base station 120 and the electronic device 110 (e.g., via the first TRP 127 and/or the second TRP 128) can perform beamformed transmission and/or reception to compensate for the propagation loss. In beamformed transmission, signal energy can be focused predominantly toward a specific direction, such as directions 121A-122A associated with the Tx beams 121-122. As a result, an increased antenna transmission gain can be achieved in contrast to omnidirectional antenna transmission. Similarly, in beamformed reception, signal energy received predominantly from a specific direction can be combined to obtain a higher antenna reception gain in contrast to omnidirectional antenna reception, such as a direction 111A associated with the Rx beam 111 of the electronic device 110.

The base stations 120 can be configured to control one or more antenna arrays to form directional beams (Tx or Rx beams) for transmitting or receiving the HF signals. As described above, a directional beam is associated with a direction indicating a dominant propagation direction of signal energy of the directional beam. In some examples, different sets of antenna arrays are distributed at different locations to cover different serving areas. Each such set of antenna arrays can be referred to as a TRP. A TRP can transmit or receive any suitable number of Tx beams or Rx beams along multiple directions.

Referring to FIG. 1, the base station 120 can control the first TRP 127 to form directional Tx beams including the Tx beams 121-122 to cover the first cell 125. The Tx beams can be generated simultaneously or in different time intervals. Further, the base station 120 can control the second TRP 128 to cover the second cell 126. In an example, a plurality of electronic devices is served by the base station 120. In an example, the electronic device 110 is within the first cell 125 and the second cell 126 and can be served by the first cell 125 and the second cell 126. The first cell 125 and the second cell 126 can partially overlap, as shown in FIG. 1. In an example, the first cell 125 is within the second cell 126.

Beam failure procedure is described below for the first cell 125 with reference to FIG. 1 where the first cell 125 and the second cell 126 are formed using the same base station 120. The description can be suitably adapted to other scenarios, such as when the first cell 125 and the second cell 126 are formed using a same TRP, when the first cell 125 and the second cell 126 are formed using different base stations, or the like.

In an embodiment, the electronic device 110 can be any suitable electronic device that can implement beam failure recovery. The electronic device 110 can be configured to receive from and transmit to a plurality of cells, such as the first and second cells 125-126 using multiple links via carrier aggregation. In an example, the electronic device 110 is a terminal device (e.g., user equipment) for wireless communication, such as a cell phone, a smart phone, a tablet computer, a laptop, a smart device, a wearable device, and the like. Similarly, the electronic device 110 can employ one or more antenna arrays to generate directional Tx or Rx beams for transmitting or receiving the HF signals. The electronic device 110 and/or the base station 120 can also include suitable transceivers and antennas that transmit and receive omnidirectional wireless signals.

In some embodiments, the electronic device 110 can be connected to multiple base stations via multiple links, such as in Evolved Universal Terrestrial Radio Access (E-UTRA) and NR dual connectivity (DC). For example, the electronic device 110 is connected to the base station 120 via the link 105 and a second base station (not shown) via a second link (not shown). In an example, the electronic device 110 is connected to the second base station using directional Tx/Rx beams, omnidirectional beams, and the like. In an example, the electronic device 110 is connected to the base station 120 using NR radio access, and to the second base station using E-UTRA.

Referring to FIG. 1, the electronic device 110 can include a transceiver 130, processing circuitry 150, and a memory 146 that are coupled together, for example, using a bus architecture (not shown). The transceiver 130 is configured to receive and transmit wireless signals. In an example, the transceiver 130 includes a first transceiver 132 that transmits and receives low frequency signals (LF signals), such as omnidirectional wireless signals, and a second transceiver 134 that transmits and receives the HF signals (e.g., FR2) including Tx and Rx beams, such as the Rx beam 111. In an example, the link 105 is formed based on the Tx beam 121 and the Rx beam 111 for the electronic device 110 to receive downlink (DL) signals from the base station 120. In the FIG. 1 example, a direction 111A of the Rx beam 111 is matched to the direction 121A of the Tx beam 121 by tuning respective antennas of the electronic device 110 and/or the base station 120.

In an example, the link 105 can be formed based on the Tx beam 121 and an omnidirectional reception beam (not shown) of the electronic device 110. In an example, the link 105 can be formed based on the Rx beam 111 and an omnidirectional transmission beam (not shown) of the base station 120.

The link 105 can also be used for the electronic device 110 to transmit uplink (UL) signals to the base station 120 via a Tx beam of the electronic device 110 and a Rx beam of the base station 120. Further, radio resources for the UL signals, such as the Tx beam of the electronic device 110 can be different from the radio resources used for the DL signals. In an example, directions of the UL signals in the link 105 are opposite to the directions 111A and 121A.

In an example, the second transceiver 134 transmits or receives the HF signals (e.g., FR2), and the first transceiver 132 causes an antenna to transmit or receive the LF signals (e.g., FR1).

In some embodiments, the transceiver 130 is configured to receive various Tx beams and/or omnidirectional beams from one or more base stations. The received Tx beams include one or more signals, such as one or more reference signals (RSs) that can be used to estimate beam and link qualities and facilitate beam failure recovery (BFR) in one or more cells that serve the electronic device 110. RSs can include a channel-state information reference signal (CSI-RS), a synchronization signal block (SSB), and the like. In some embodiments, an SSB that includes resources in time and frequency is formed with a primary synchronization signal (PSS), a secondary synchronization signal (SSS), and a Physical Broadcast Channel (PBCH). In an example, the received Tx beams include the Tx beams 121-122 in the first cell 125, and RS(s) in the first cell 125 are used to detect beam failure in the first cell 125. In an example, RS(s) in the second cell 126 are used to detect beam failure in the first cell 125. In some examples, RS(s) from another base station can be used to detect beam failure in the first cell 125.

The transceiver 130 is configured to transmit various signals, such as the HF signals and the LF signals. In an embodiment, the transceiver 130 can transmit a beam failure recovery request (BFRQ) to the base station 120, for example, using UL physical channels, such as a Physical Random Access Channel (PRACH), a PUCCH, a NR-PRACH, a NR-PUCCH, and the like, indicating beam failure on a cell, such as the first cell 125. An UL physical channel, such as a PUCCH or a NR-PUCCH, can be on the first cell 125, the second cell 126, a PCell, a PSCell, a SCell, or the like. When the electronic device 110 is served by the first cell 125 and the second cell 126, such as in carrier aggregation, the BFRQ on the first cell 125 can be transmitted using an UL physical channel in the first cell 125 or the second cell 126. In an example, the transceiver 130 can transmit cell-related information, new beam information, and/or the like to the base station 120 via a PUSCH, a PUCCH, or the like.

In some embodiments, the transceiver 130 can transmit signal carrying information of the BFRQ to another base station connected to the electronic device 110. The other base station can send the signal to the base station 120.

The processing circuitry 150 is configured to implement BFR including beam failure detection (BFD), new beam identification, a BFRQ procedure, and BFRR reception. The processing circuitry 150 can measure one or more signals, such as RS(s), to obtain signal qualities including reference signal received power (RSRP), reference signal received quality (RSRQ), block error rate (BLER), and the like. Accordingly, beam failure detection can be based on the signal qualities. A BFD RS resource can be explicitly configured as a periodic CSI-RS resource for beam failure detection. Alternatively, a BFD RS resource can be implicitly configured as an SSB and/or a periodic CSI-RS resource. For example, the electronic device 110 can use an SSB and/or a periodic CSI-RS resource for beam failure detection based on a pre-defined rule. In an example, the electronic device 110 is served by the first cell 125. When a signal quality or signal qualities of available BFD RS resource(s) in the first cell 125 are worse than respective first threshold(s), a beam failure instance (BFI) of the first cell 125 can be declared. In an example, beam failure in the first cell 125 is detected or declared when a number of consecutive BFIs of the first cell 125 is equal to or larger than a threshold, such as a maximum number configured by Radio Resource Control (RRC). Alternatively or additionally, signal(s) from the second cell 126 can be used for BFD in the first cell 125.

The processing circuitry 150 can be configured to identify a new beam used in forming the new link in a failed cell, such as the first cell 125. A set of resources (also referred to as a set of candidate beam resources) can be explicitly configured for the electronic device 110. In an embodiment, each candidate beam resource can be transmitted in a DL beam, and thus the set of resources corresponds to a set of candidate beams from the base station 120. One of the candidate beam resources can be an SSB and/or a periodic CSI-RS resource. The processing circuitry 150 can measure signal qualities, such as RSRP, of the candidate beam resources transmitted from the respective candidate beams. Further, the processing circuitry 150 can determine a new beam from the candidate beam resources based on the qualities of the candidate beam resources. In an example, when RSRP of a candidate beam resource exceeds a second threshold, the candidate beam resource corresponds to the new beam. In an example, when RSRPs of multiple candidate beam resources exceed the second threshold, the processing circuitry 150 can determine one of the multiple candidate beam resources to be the new beam.

Figure 3A:
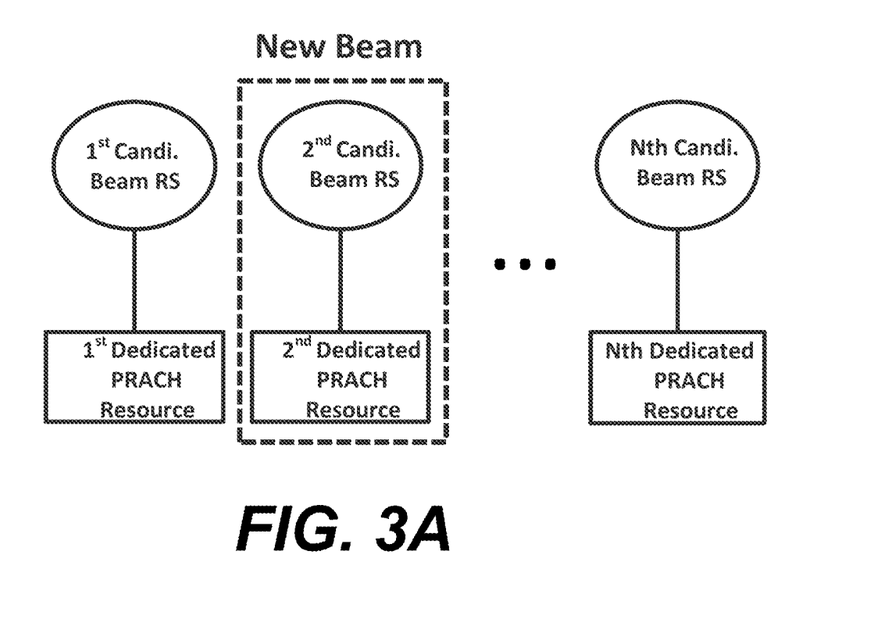
FIG. 3A shows an exemplary new beam detection according to an embodiment of the disclosure.

The processing circuitry 150 can be configured to implement a BFRQ procedure. In a first BFRQ procedure, the processing circuitry 150 can transmit the BFRQ using a contention-free PRACH based scheme where a dedicated PRACH resource is associated with each candidate beam RS resource. Referring to FIG. 3A, a first dedicated PRACH resource is associated with a first candidate beam RS resource, a second dedicated PRACH resource can be associated with a second candidate beam RS resource, an Nth dedicated PRACH resource can be associated with an Nth candidate beam RS resource, and the like where N is a positive integer. The new beam corresponding to one of the candidate beam RS resources, such as the second candidate beam RS resource, is identified. Accordingly, when the beam failure is detected and the new beam is identified, the processing circuitry 150 can initiate the BFRQ by transmitting the second dedicated PRACH resource associated with the second candidate beam RS resource.

In an embodiment, the electronic device 110 is configured with a PCell and multiple SCells. When the first BFRQ procedure is applied for the multiple SCells, a relatively large amount of dedicated (or contention free) PRACH resources on the PCell is used and a UL overhead for the PCell can be relatively large. For example, the electronic device 110 is configured with 16 SCells, 64 candidate beams RS resources, for example, corresponding to different directions, are configured for each SCell, and thus 1024 dedicated PRACH resources on the PCell need to be reserved for BFRQs on the 16 SCells using the first BFRQ procedure.

According to aspects of the disclosure, the processing circuitry 150 can be configured to implement a second BFRQ procedure that includes the 2-step BFRQ procedure described above. In the 1st step, the processing circuitry 150 can be configured to transmit a BFRQ to the network 101, for example, by using a PUCCH, a NR-PUCCH, or the like, to indicate the beam failure on the first cell 125 when beam failure is detected on the first cell 125. In an example, cell-related information, e.g., a cell index, is not transmitted in the $1^{st}$ step and thus is unknown to the network 101. When beam failure is detected on a plurality of cells that serve the electronic device 110, the processing circuitry 150 can be configured to transmit a BFRQ to the network 101 to indicate the beam failure on the plurality of cells without reporting cell-related information of the plurality of cells. According to an aspect of the disclosure, new beam information is not included in the BFRQ in the $1^{st}$ step. In an example, the processing circuitry 150 indicates the beam failure on the first cell 125 using a certain sequence such as a preamble sequence. The preamble sequence can be pre-configured using a sequence-based PUCCH resource in a SR-like configuration.

In the $2^{nd}$ step, the processing circuitry 150 can report to the network 101 information of the failed cell(s), such as the first cell 125, and/or corresponding new beam information of the new beam, for example, by a payload transmitted on an UL channel. The information of the failed cell(s) can include an index or indices of the failed cell(s). The BFRQ can also include information of the electronic device 110. The payload and the UL channel can be MAC CE on PUSCH, UCI on PUCCH, or the like. In an example, the new beam information is an index of a candidate beam resource corresponding to the new beam. When no new beam is identified, the processing circuitry 150 can report a state that no new beam is identified on the first cell 125.

When compared with the first BFRQ procedure, the second BFRQ procedure can reduce a UL overhead for the PSCell (e.g., the second cell 126).

In an embodiment, the processing circuitry 150 is configured to implement a BFRQ procedure. The processing circuitry 150 can indicate beam failure of the failed cell(s), such as the first cell 125, to the network 101, for example, using a specific preamble sequence without new beam information and information of the failed cell(s). The preamble sequence can be pre-configured. The failed cell(s) can be SCell(s). The new beam information can be carried via payload in a PUCCH or via MAC CE in a PUSCH. The payload can carry information of the failed cell(s) and new beam information. For example, when the PUCCH resource or the PUSCH resource is located in a different cell, such as a PCell, a PSCell, or other SCell, than the failed cell(s), such as SCell(s), the information of the failed cell(s) and new beam information can be provided to the network 101.

Figure 3B:
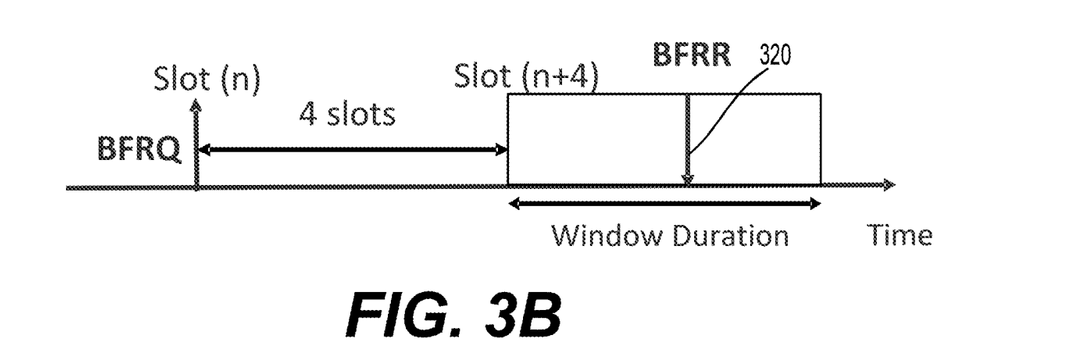
FIG. 3B shows an exemplary beam failure recovery response according to an embodiment of the disclosure.

The processing circuitry 150 can be configured to monitor for a network response or a BFRR. In an embodiment, after transmitting the BFRQ, the processing circuitry 150 monitors downlink for the BFRR. For example, the processing circuitry 150 applies quasi co-location (QCL) parameters associated with the candidate beam RS resource corresponding to the new beam for reception of the BFRR. Referring to FIG. 3B, the processing circuitry 150 monitors a Physical Downlink Control Channel (PDCCH) in a specific search space set provided by RRC within a window duration, for example, configured by the network 101, to detect a downlink control information (DCI) format with cyclic redundancy check (CRC) scrambled by a cell radio-network temporary identifier (C-RNTI) or modulation and coding scheme (MCS)-C-RNTI. The BFRQ transmission occurs at a slot (n), and monitoring for the BFRR starts 4 slots after the BFRQ transmission at a slot (n+4). The BFRR can be monitored during the window duration. In an example, the processing circuitry 150 receives the BFRR as indicated by an arrow 320 within the window duration. In an example, the PDCCH is associated with the new beam.

In an embodiment, reception of the network response can be on a cell where the corresponding BFRQ does not include new beam information or another cell that does not allow directly applying the new beam QCL for reception. The network response can be transmitted on a non-failing cell. In an example, the BFRQ of the failed cell, such as the first cell 125, is transmitted on a DL/UL cell of the electronic device 110, and thus the network response is transmitted in the DL/UL cell. The network response can also be transmitted using control beam pair link on corresponding SS-BFR.

In an embodiment, the network response is transmitted in the failed cell(s) and no new beam information is identified during the BFRQ procedure. The network response can be transmitted in a beam sweeping manner. The transmission resources can be preconfigured and may correspond to QCL assumption.

In an example, the network response transmitted in a non-failing cell can trigger aperiodic beam reporting on the failed cell(s).

The network response can be transmitted in the failed cell(s) or another cell that allows applying new beam QCL for reception. In an example, no new beam is identified during the BFRQ procedure, when the failed cell, such as the first cell 125, is a SCell, the processing circuitry 150 can report that no new beam is identified for the SCell. In an example, the network response is transmitted in a non-failing cell of the electronic device 110. When the failed cell, such as the first cell 125, is a SCell, the network response and/or the BFRQ on the SCell can be transmitted in a PCell or a PSCell that serves the electronic device 110.

The processing circuitry 150 can determine whether the beam failure recovery is successful based on reception of the BFRR within the window duration, for example, by detecting the DCI format with the CRC scrambled by the C-RNTI or the MCS-C-RNTI in the specific space set. In some examples, the processing circuitry 150 receives the BFRR within the window duration and determines that the beam failure recovery is successful, the processing circuitry 150 then performs beam switching. In an example, when the processing circuitry 150 determines that the beam failure recovery fails, for example, when the processing circuitry 150 does not receive the BFRR during the window duration, the processing circuitry declares a Radio Link Failure (RLF).

In an example, after beam failure recovery, the processing circuitry 150 can use the same QCL of the new beam for PDCCH monitoring in the specified search space set and for corresponding PDSCH reception. The processing circuitry 150 can continue to monitor PDCCH candidates in the specific search space set until the electronic device 110 receives a MAC CE activation command for a Transmission Configuration Index (TCI) state or TCI-StatesPDCCH-ToAddlist and/or TCI-StatesPDCCH-ToReleaseList.

In an example, the electronic device 110 is in dual connectivity with the base station 120 and the other base station. The new beam information can be communicated to the base station 120 via the other base station that is connected to the electronic device 110 via, for example, omnidirectional signals. Thus, the electronic device 110 can be suitably adapted to perform beam failure recovery.

The processing circuitry 150 can be implemented using various techniques, such as integrated circuits, one or more processors executing software instructions, and the like.

The memory 146 can be any suitable device for storing data and instructions to control operations of the electronic device 110. In an example, the memory 146 stores thresholds and instructions associated with beam failure recovery, and software instructions to be executed by a processor, such as the processing circuitry 150. In an example, the thresholds include the first thresholds, the second threshold, and the like. The memory 146 can store various results including signal qualities.

In an embodiment, the memory 146 can be non-volatile memory, such as read-only memory, flash memory, magnetic computer storage devices, hard disk drives, solid state drives, floppy disks, and magnetic tape, optical discs, and the like. In an embodiment, the memory 146 can be a random access memory (RAM). In an embodiment, the memory 146 can include non-volatile memory and volatile memory.

Figure 2:
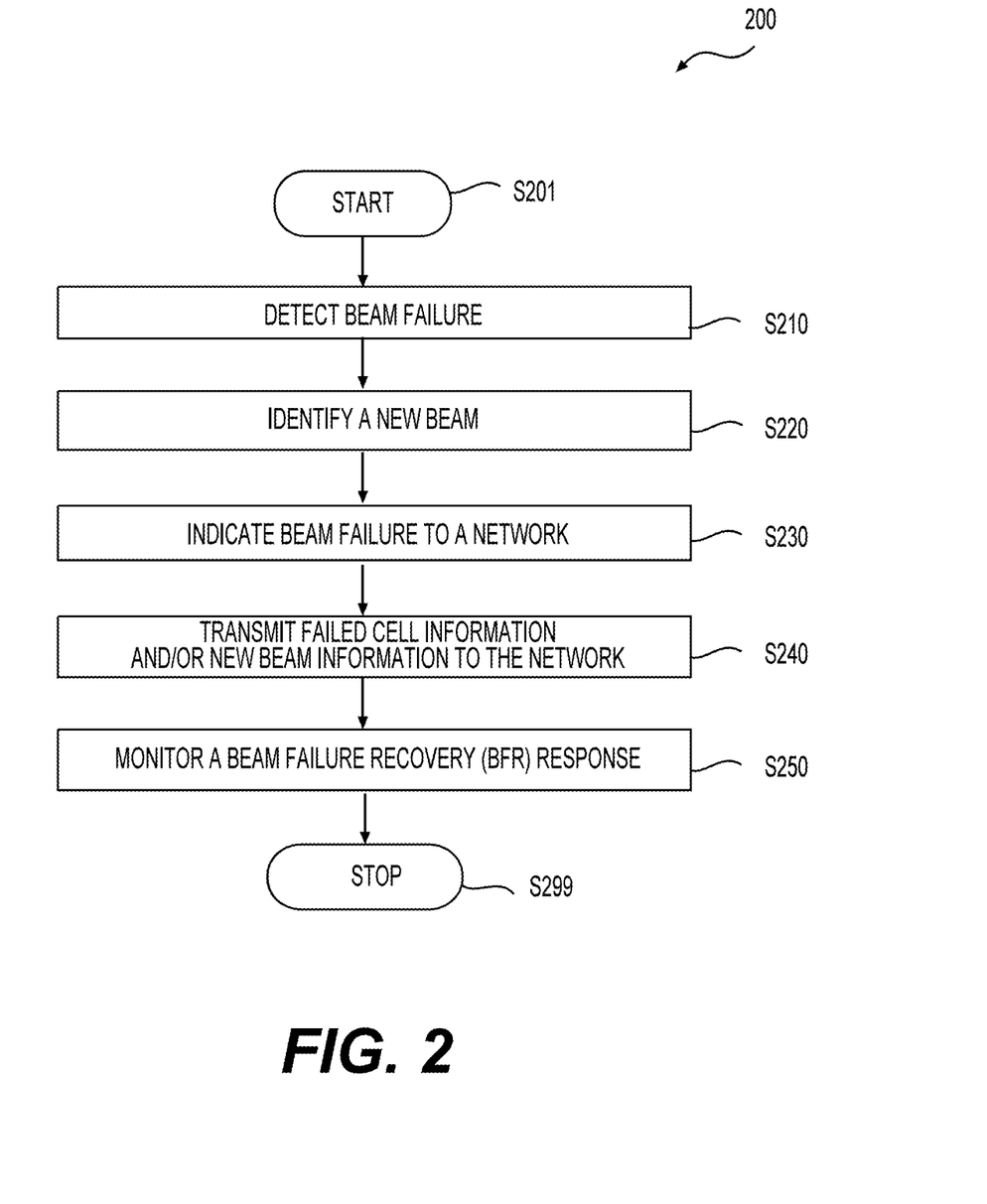
FIG. 2 shows a flow chart of an exemplary process 200 for beam failure recovery according to an embodiment of the disclosure.

FIG. 2 shows a flowchart of an exemplary process 200 according to an embodiment of the disclosure. The process 200 can be used to implement beam failure recovery. In an example, an electronic device, such as the electronic device 110, is configured to perform the process 200. The process 200 starts at S201, and proceeds to S210.

At S210, beam failure on a cell can be detected. Signals, such as RSs associated with one or more Tx beams from cell(s), such as the cell, can be measured to obtain signal qualities including RSRP, RSRQ, BLER, and the like. In an example, the cell is a SCell. Beam failure can be detected based on the signal qualities, as described above with reference to FIG. 1. Of course, beam failure on additional cell(s) can also be detected similarly.

At S220, a new beam can be identified for beam failure recovery in the failed cell, such as the first cell 125, based on a set of resources configured for the electronic device, as described above. Signal qualities, such as RSRP, of the candidate beam resources transmitted from the set of candidate beams can be measured by the electronic device. The new beam can be determined from the candidate beam resources based on the signal qualities. In an example, when RSRP of a candidate beam resource exceeds the second threshold, the candidate beam resource can be identified as the new beam used to form a new link. In an example, when signal qualities of all candidate beam resources do not exceed the second threshold, no new beam is identified. S210 and S220 can be implemented in any suitable order. For example, S210 and S220 can start at a same time. In some embodiments, S210 and S220 do not have to be implemented in a sequential order.

At S230, beam failure on the failed cell is indicated to a network. When beam failure is detected for the failed cell, such as the first cell 125, a BFRQ can be transmitted to the network, such as the network 101, indicating the beam failure, for example, by using a PUCCH, a NR-PUCCH, or the like. In an example, the new beam information and information of the failed cell are not carried in the BFRQ. As described above, the beam failure can be indicated using a certain sequence, such as a sequence-based PUCCH resource in the SR-like configuration.

Figure 4:
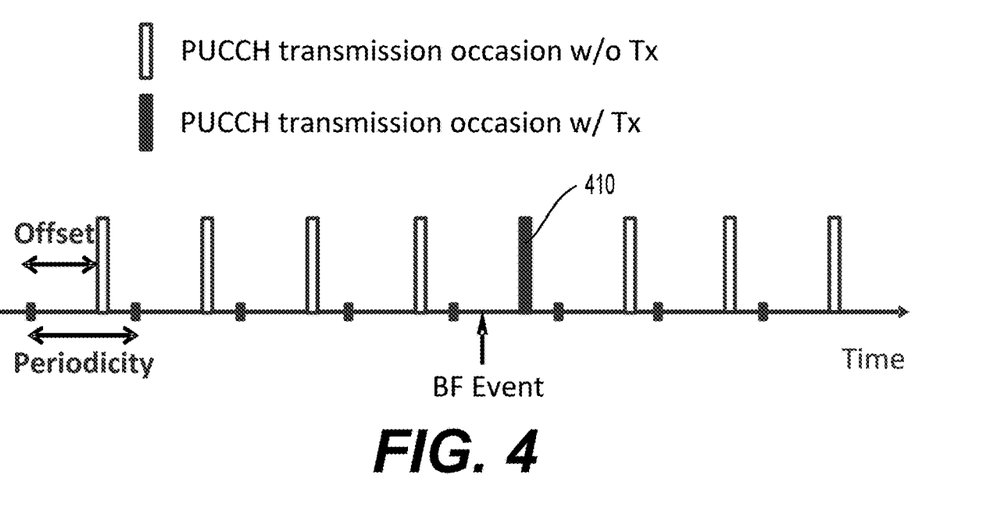
FIG. 4 shows a diagram illustrating an exemplary configuration to indicate beam failure according to an embodiment of the disclosure.

Referring to FIG. 4, similar to a SR configuration, the SR-like configuration can include a resource identifier (ID) indicating that a PUCCH resource is provided for a PUCCH transmission conveying the BFRQ. The SR-like configuration can include a period and an offset of a PUCCH transmission occasion using the PUCCH resource. The period indicates a periodicity of the SR-like configuration. The offset indicates a position of the PUCCH transmission occasion in time domain. In an example, the SR-like configuration includes at least the resource ID, the period, and the offset. In an example, the PUCCH resource is transmitted on a PUCCH transmission occasion 410 only when a beam failure (BF) event occurs on a cell (i.e., the beam failure is detected), as shown in FIG. 4. The PUCCH resource can be transmitted using a sequence-based PUCCH format, such as a PUCCH format 0 (PF0) or a PUCCH format 1 (PF1) as described below with reference to FIGS. 6A-6D and 7A-7C.

At S240, information of the failed cell can be transmitted to the network, for example, by a payload on an UL channel. Corresponding new beam information can also be transmitted when the new beam is identified. The payload and the UL channel can be MAC CE on PUSCH, UCI on PUCCH, or the like. In an example, the information of the failed cell is an index of the failed cell, and the new beam information is an index of a candidate beam resource corresponding to the new beam.

At S250, a BFRR can be monitored. For example, the electronic device can monitor a PDCCH in a specified search space set for the BFRR, as described with reference to FIG. 1. Referring to FIG. 3B, the monitoring for the BFRR can start 4 slots after the BFRQ transmission. In other words, the BFRQ transmission occurs at the slot (n) and the monitoring for the BFRR starts at the slot (n+4). The window duration, e.g., a parameter ra-ResponseWindow, can be configured by the RRC. The process 200 proceeds to S299, and terminates.

In an example shown in FIG. 3B, the BFRR is detected within the window duration, and thus the beam failure recovery is successful based on the reception of the BFRR. Accordingly, a beam switching can be performed to form the new link in the failed cell.

The process 200 for beam failure recovery can be suitably adapted for various applications and scenarios in communication systems.

In an embodiment, such as in the first BFRQ procedure, when the beam failure is declared at S210 and the new beam is identified at S220, steps S230 and S240 are combined where the BFRQ is transmitted and the new beam information is reported together with the BFRQ or after the BFRQ.

In an embodiment, the 2-step BFRQ procedure can be implemented as follows. At S210, the beam failure is declared. When the beam failure is declared, S230 is implemented as the $1^{st}$ step BFRQ to indicate the beam failure. The $1^{st}$ step BFRQ can be implemented regardless of whether or not the new beam is identified. S220 can start before or after S230. In an example, S230 and S220 are implemented in parallel. S240 is implemented as the $2^{nd}$ step BFRQ to report the information of the failed cell and/or the new beam information. In an example, S240 starts when the beam failure is declared and the new beam is identified, and a PUSCH resource is ready by an UL grant or a configured grant.

In an embodiment, only the 2nd step BFRQ is implemented for the 2-step BFRQ procedure and S230 and S240 can be combined into a single step. After the beam failure is declared, and a PUSCH resource is already granted by an UL grant signal or a configured grant signal, S240 starts to report the information of the failed cell and/or the new beam information to the network.

The description above can be suitably adapted to a plurality of cells where the BFR procedures can be applied for one or more cells that fail.

Figure 5A:
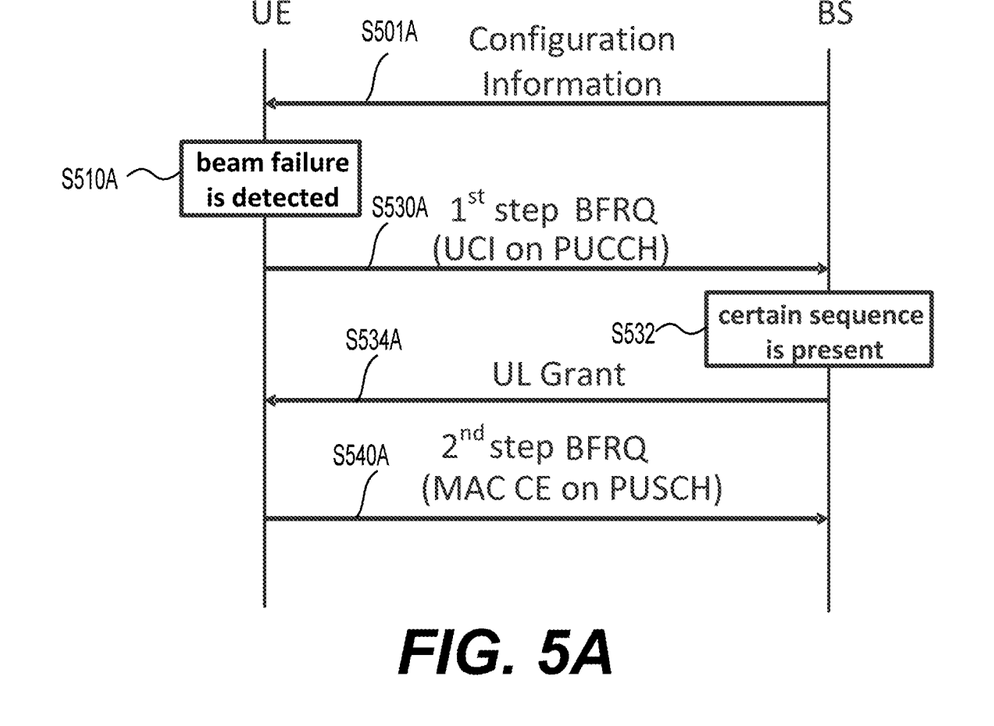
FIG. 5A shows a process performed by an electronic device and a base station in a communication system according to an embodiment of the disclosure.
Figure 5B:
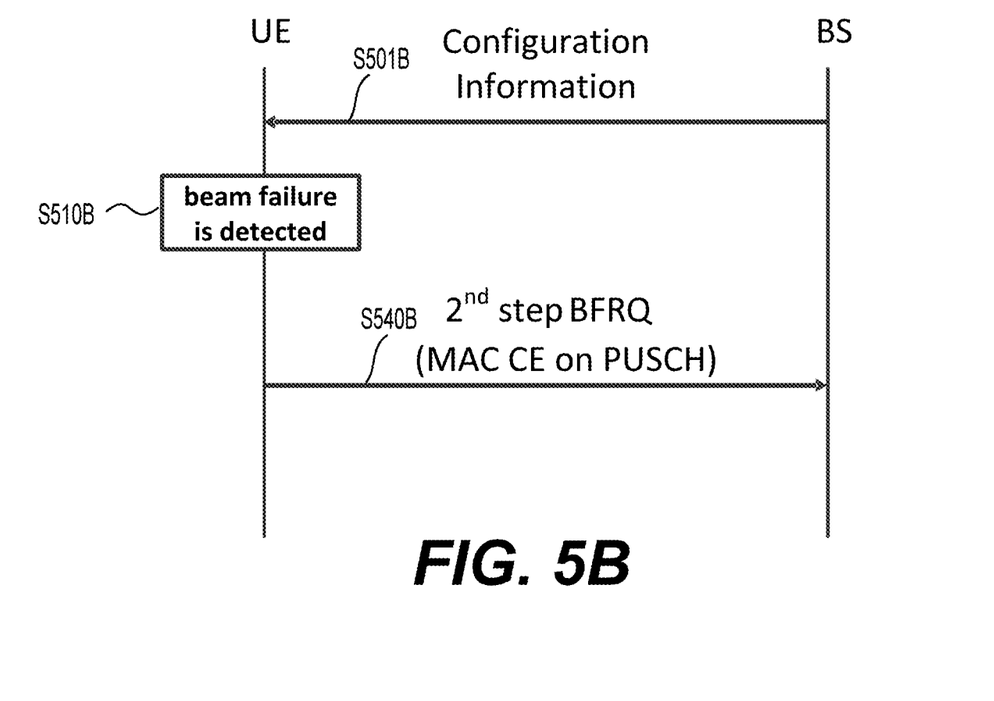
FIG. 5B shows a process performed by an electronic device and a base station in a communication system according to an embodiment of the disclosure.

FIGS. 5A-5B show examples of beam failure recovery using the 2-step BFRQ procedure according to embodiments of the disclosure. Referring to FIG. 5A, at S501A, configuration information, such as a PUCCH used to transmit the BFRQ, for the 1st step can be transmitted from a base station, such as the base station 120, to an electronic device, such as the electronic device 110. The configuration information can include information of a resource ID, a period, and an offset for a SR-like configuration. The configuration information can indicate a PUCCH format, such as PF0 or PF1, for example, using the resource ID.

At S510A, beam failure detection is implemented for one or more cells of the electronic device, as described in S210 with reference to FIG. 2. At S530A, the 1st step is implanted using UCI on the PUCCH to indicate beam failure on failed cell(s) in the one or more cell(s) configured to the UE. In an example, the beam failure detection is implemented in a SCell, and the PUCCH is configured for a PCell or a PSCell, for example, when the SCell is a DL only cell. The PUCCH can be configured for the SCell when the SCell is a DL/UL cell. At S532, the base station can determine whether a certain sequence, such as a preamble sequence, is present. At S534A, when the certain preamble sequence is present, the base station can transmit a UL grant signal granting a PUSCH to the electronic device. At S540A, the 2nd step BFRQ is implemented on MAC CE on the PUSCH granted by the UL grant signal. The MAC CE can include information of the failed cell(s), such as an index or indices of the failed cell(s), and corresponding new beam information.

Referring to FIG. 5B, at S501B, configuration information can be transmitted from a base station as described in S501A with reference to FIG. 5A. At S510B, beam failure detection is implemented as described in S510A with reference to FIG. 5A.

At S540B, a PUSCH after S510B is already granted by an UL grant signal or a configured grant signal, the $2^{nd}$ step is implemented on MAC CE on the PUSCH. The MAC CE can include information of the failed cell(s), such as an index or indices of the failed cell(s), and corresponding new beam information. Comparing FIGS. 5A-5B, the $1^{st}$ step (or S530A) implemented before the $2^{nd}$ step (or S540A) may be required only when no PUSCH is granted after the beam failure is detected on one or more cells. In an embodiment, such as shown in FIG. 5B, the $1^{st}$ step (or S530A) implemented before the $2^{nd}$ step (or S540A) is not required when a PUSCH is granted after the beam failure is detected on one or more cells. In an example, a time gap or an amount of time between the beam failure event and the granted PUSCH is less than or equal to a certain value.

Figures 6A, 6B, 6C, 6D:
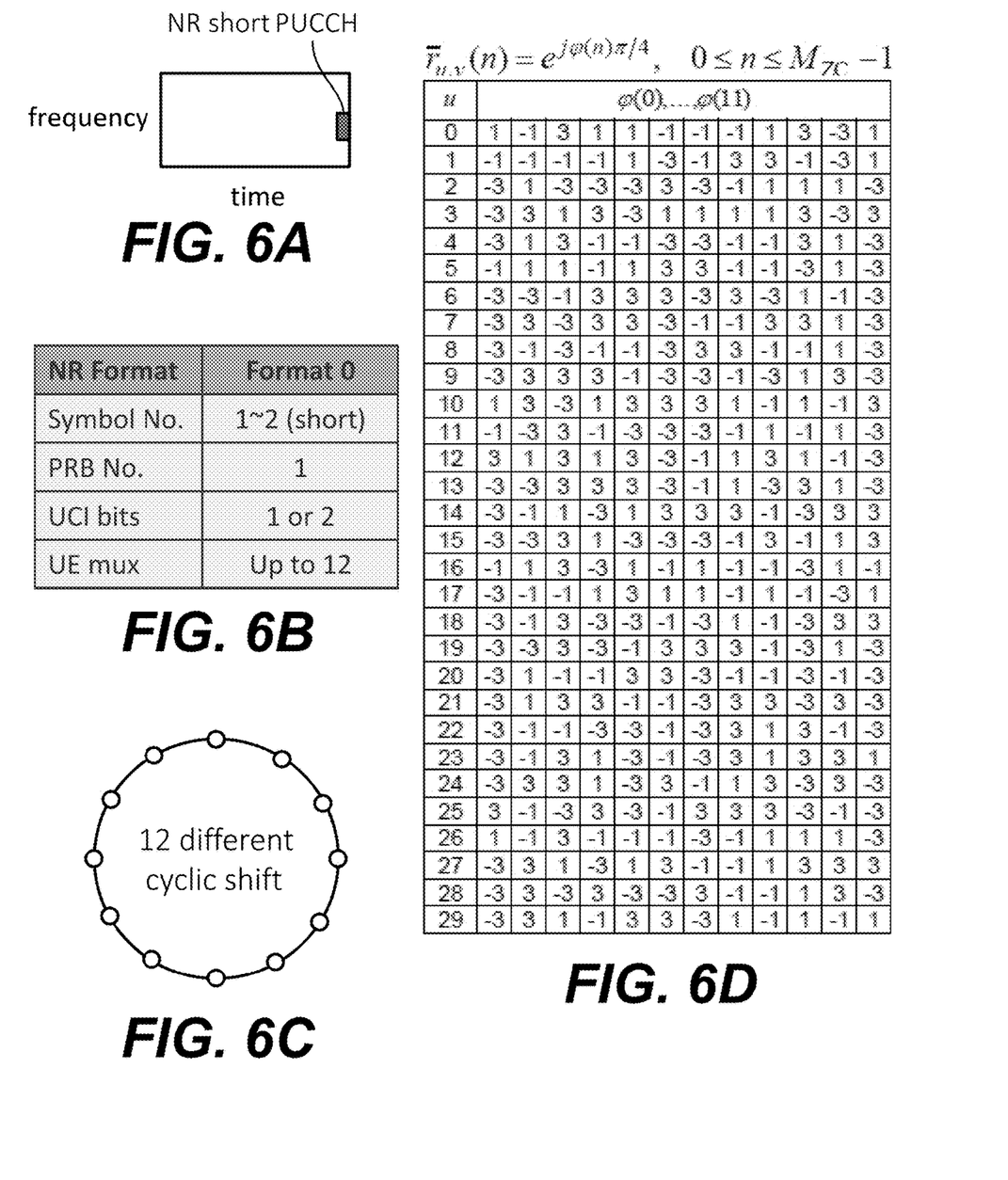
FIG. 6A-6D show an exemplary Physical Uplink Control Channel (PUCCH) format according to an embodiment of the disclosure.

As described above, the PUCCH resource described in FIGS. 4, 5A and 5B can be transmitted using a PF0 or PF1. FIGS. 6A-6D show an example of PF0. PF0 is also referred to as a short PUCCH format. Referring to FIGS. 6A-6B, PF0 can occupy 1 physical resource block (PRB) in a frequency domain. Referring to FIGS. 6A-6B, PF0 is capable of transmitting 1 or 2 bits (or UCI bits) and spans 1 or 2 OFDM symbols (or symbols) in a time domain. In an example, 2 OFDM symbols can be transmitted to enhance coverage.

Sequence selection is the basis for PF0. In an example, a transmitted sequence is generated by a different phase rotation of a same length-12 base sequence, and thus the phase rotation applied to the base sequence carries the information, such as beam failure, to be transmitted. Twelve different phase rotations can be defined for the same base sequence, providing up to 12 different orthogonal sequences from each base sequence. A linear phase rotation in the frequency domain is equivalent to applying a cyclic shift in the time domain, as shown in FIG. 6C. In an example shown in FIG. 6D, 30 length-12 sequences with low cross-correlation can be chosen, and thus can be used in 30 different cells, for example, including a plurality of SCells, to maintain a low inter-cell interference. In an example, a phase rotation applied to a certain OFDM symbol also depends on a reference rotation where the reference rotation enables multiplexing multiple electronic devices on a same time-frequency resource. Accordingly, PF0 allows up to 12 electronic devices to be multiplexed as indicated in FIG. 6B.

In an embodiment, UCI transmission can be implemented by the sequence selection. In an example, when a certain sequence is given, the presence of the certain sequence indicates the BFRQ transmission and the absence of the certain sequence indicates no BFRQ transmission. In an example, an initial cyclic shift can be used to define a sequence associated with a PUCCH resource.

Figure 7A:
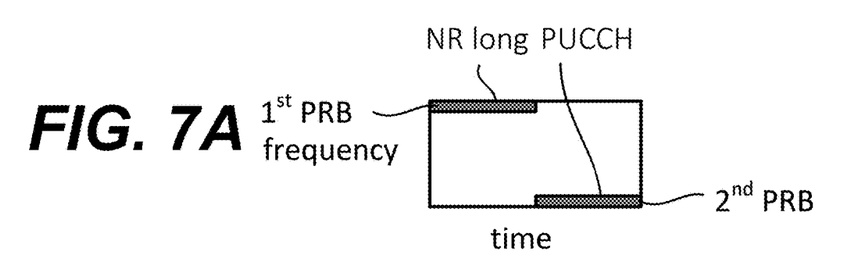
FIG. 7A-7C show an exemplary PUCCH format according to an embodiment of the disclosure.
Figure 7B:
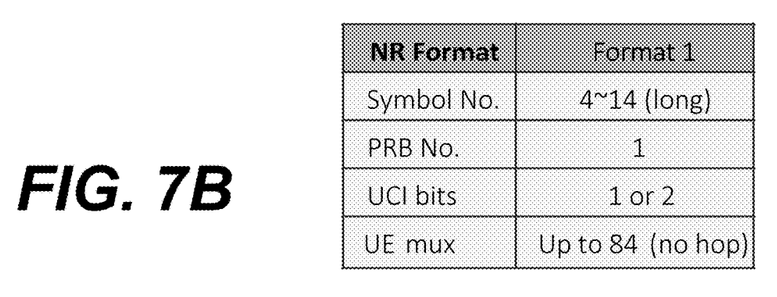
Figure 7C:
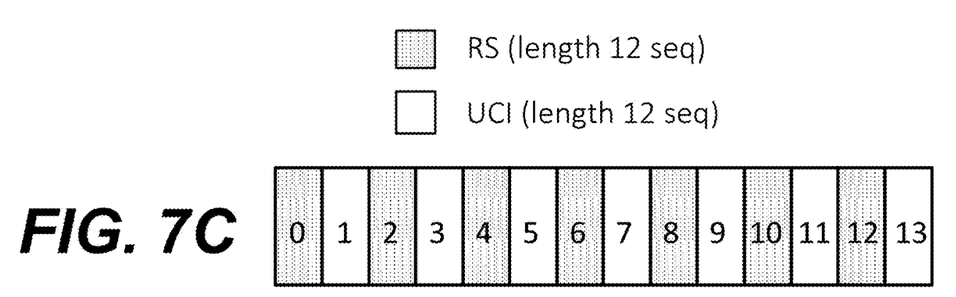

FIGS. 7A-7C show an example of PF1. Referring to FIGS. 7A-7B, PF1 can occupy 1 PRB in a frequency domain. FIG. 7A shows a frequency hopping where PF1 occupies a first PRB and then a second PRB.

Referring to FIG. 7B, PF1 is capable of transmitting 1 or 2 bits (or UCI bits) and spans 4 to 14 OFDM symbols in a time domain, and thus PF1 is also referred to as a long PUCCH format. The OFDM symbols can be split between symbols for control information and symbols for RSs. Referring to FIG. 7C, when 14 symbols are used in a PUCCH without frequency hopping, 7 even symbols are used for an RS (e.g., a DMRS), and 7 odd symbols are used to carry the UCI. In another words, a length-7 orthogonal covering code (OCC) is used for the RS and a length-7 OCC is used for the UCI. The 14 symbols can be counted as 0 to 13, and thus the 7 even symbols correspond to the 0th, 2nd, 4th, 6th, 8th, 10th, and 12th symbols.

The UCI bit(s) can be BPSK or QPSK modulated and multiplied by a length-12 sequence that is similar or identical to that used for PF0. Similarly, 30 length-12 sequences with low cross-correlation can be chosen, and thus can be used in 30 different cells, for example, including a plurality of SCells, to maintain low inter-cell interference. Referring to FIG. 7B, in an example, when PF1 is used without frequency hopping, up to 84 electronic devices can be multiplexed due to the linear phase shift in the frequency domain and the OCC in the time domain.

UCI transmission can be implemented by the sequence selection. In an example, when a certain sequence is given, the presence of the certain sequence indicates the BFRQ transmission and the absence of the certain sequence indicates no BFRQ transmission. In an example, an initial cyclic shift and a time domain OCC can be used to define a PUCCH resource.

The various circuitry, circuits, components, modules, and the like in the present disclosure can be implemented using any suitable technology, such as an integrated circuit (IC), ICs, digital signal processors (DSPs), microprocessors, CPUs, field programmable gate arrays, (FPGAs), Application-specific integrated circuits (ASICs), and the like. In an example, the various circuitry, components, modules, and the like can also include one or more processing circuits executing software instructions.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   wirelessly receiving at least one signal from a network including a first cell configured for an electronic device;
   determining whether beam failure occurs on the first cell based on at least one signal quality of the at least one signal; and
   in response to the beam failure being determined to occur on the first cell,
      performing a first step of a 2-step beam failure recovery request (BFRQ) procedure by transmitting a BFRQ to the network when no resource is available for reporting information of the first cell to the network, the BFRQ being a PUCCH transmission with PUCCH format 0 or PUCCH format 1 indicating the beam failure at the electronic device;
      receiving an uplink (UL) grant signal from the network after transmitting the BFRQ, the UL grant signal granting a resource to the electronic device; and
      performing a second step of the 2-step BFRQ procedure by reporting the information of the first cell to the network using the granted resource, the information of the first cell indicating a cell index of the first cell.

2. The method according to claim 1, further comprising:
   receiving at least one second signal from the network;
   identifying a new beam for the first cell when at least one signal quality of the at least one second signal is equal to or larger than a threshold, the new beam corresponding to one of the at least one second signal; and
reporting information of the new beam to the network after transmitting the BFRQ to the network.

3. The method according to claim 2, further comprising:
reporting the information of the first cell and the information of the new beam to the network using a medium access control (MAC) control element (CE) transmitted on a Physical Uplink Shared Channel (PUSCH) granted by the UL grant signal.

4. The method according to claim 2, wherein the performing the first step of the 2-step BFRQ procedure comprises:
transmitting the BFRQ using a Physical Uplink Control Channel (PUCCH).

5. The method according to claim 4, wherein the transmitting the BFRQ comprises:
transmitting the BFRQ using a PUCCH resource that is sequence-based in a scheduling request (SR)-like configuration that includes a resource identifier (ID), a period and an offset of a PUCCH transmission occasion using the PUCCH resource.

6. The method according to claim 4, wherein:
the electronic device is served by a second cell configured with the PUCCH; and
the method further includes transmitting the BFRQ using the PUCCH configured for the second cell.

7. The method according to claim 4, wherein
the resource includes a Physical Uplink Shared Channel (PUSCH) to the electronic device, and
the method further includes receiving configuration information for the PUCCH.

8. The method according to claim 7, further comprising:
reporting the information of the first cell and the information of the new beam using a medium access control (MAC) control element (CE) transmitted on the PUSCH granted by the UL grant signal.

9. An electronic device, comprising:
a transceiver configured to wirelessly receive at least one signal from a network including a first cell configured for an electronic device; and
processing circuitry configured to:
determine whether beam failure occurs on the first cell based on at least one signal quality of the at least one signal; and
in response to the beam failure being determined to occur on the first cell,
perform a first step of a 2-step beam failure recovery request (BFRQ) procedure by transmitting a BFRQ to the network when no resource is available for reporting information of the first cell to the network, the BFRQ being a PUCCH transmission with PUCCH format 0 or PUCCH format 1 indicating the beam failure at the electronic device; and
perform a second step of the 2-step BFRQ procedure by reporting the information of the first cell to the network using a resource granted by the network, wherein the information of the first cell indicates a cell index of the first cell, an uplink (UL) grant signal is received from the network after the BFRQ is transmitted, and the resource is granted to the electronic device by the UL grant signal.

10. The electronic device according to claim 9, wherein the transceiver is configured to receive at least one second signal from the network; and
the processing circuitry is further configured to:
identify a new beam for the first cell when at least one signal quality of the at least one second signal is equal to or larger than a threshold, the new beam corresponding to one of the at least one second signal; and
report information of the new beam to the network after transmitting the BFRQ to the network.

11. The electronic device according to claim 10, wherein the processing circuitry is further configured to:
report the information of the first cell and the information of the new beam to the network using a medium access control (MAC) control element (CE) transmitted on a Physical Uplink Shared Channel (PUSCH) granted by the UL grant signal.

12. The electronic device according to claim 10, wherein the processing circuitry is further configured to:
transmit the BFRQ using a Physical Uplink Control Channel (PUCCH).

13. The electronic device according to claim 12, wherein the processing circuitry is further configured to:
transmit the BFRQ using a PUCCH resource that is sequence-based in a scheduling request (SR)-like configuration that includes a resource identifier (ID), a period and an offset of a PUCCH transmission occasion using the PUCCH resource.

14. The electronic device according to claim 12, wherein:
the electronic device is served by a second cell configured with the PUCCH; and
the processing circuitry is further configured to transmit the BFRQ using the PUCCH configured for the second cell.

15. The electronic device according to claim 12, wherein the transceiver is configured to:
receive configuration information for the PUCCH; and
the resource includes a Physical Uplink Shared Channel (PUSCH) to the electronic device.

16. The electronic device according to claim 15, wherein the processing circuitry is further configured to:
report the information of the first cell and the information of the new beam using a medium access control (MAC) control element (CE) transmitted on the PUSCH granted by the UL grant signal.

17. A non-transitory computer readable medium having computer readable instructions stored thereon which, when executed by a processing circuit, cause the processing circuit to perform a method, the method comprising:
wirelessly receiving at least one signal from a network including a first cell configured for an electronic device;
determining whether beam failure occurs on the first cell based on at least one signal quality of the at least one signal; and
in response to the beam failure being determined to occur on the first cell,
performing a first step of a 2-step beam failure recovery request (BFRQ) procedure by transmitting a BFRQ to the network when no resource is available for reporting information of the first cell to the network, the BFRQ being a PUCCH transmission with PUCCH format 0 or PUCCH format 1 indicating the beam failure at the electronic device;
receiving an uplink (UL) grant signal from the network after transmitting the BFRQ, the UL grant signal granting a resource to the electronic device; and
performing a second step of the 2-step BFRQ procedure by reporting the information of the first cell to the network using the granted resource, the information of the first cell indicating a cell index of the first cell.

18. The non-transitory computer readable medium according to claim 17, wherein the method further comprises:
  receiving at least one second signal from the network;
  identifying a new beam for the first cell when at least one signal quality of the at least one second signal is equal to or larger than a threshold, the new beam corresponding to one of the at least one second signal; and
  reporting information of the new beam to the network after transmitting the BFRQ to the network.

* * * * *